(12) United States Patent
Roberts et al.

(10) Patent No.: US 12,177,519 B2
(45) Date of Patent: Dec. 24, 2024

(54) DYNAMIC SPLASH SCREEN DURING AN APPLICATION LAUNCH SEQUENCE FOR MEDIA STREAMING DEVICES

(71) Applicant: ROKU, INC., San Jose, CA (US)

(72) Inventors: John Roberts, San Jose, CA (US);
Mark Young, Georgetown, TX (US);
Kaushiki Priyam, Bihar (IN); Danylo Levin, San Jose, CA (US); Ryan Pressler, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/547,713

(22) Filed: Dec. 10, 2021

(65) Prior Publication Data
US 2023/0188786 A1  Jun. 15, 2023

(51) Int. Cl.
*H04N 21/443* (2011.01)
*H04N 21/431* (2011.01)

(52) U.S. Cl.
CPC ....... *H04N 21/443* (2013.01); *H04N 21/4312* (2013.01)

(58) Field of Classification Search
CPC .................. H04N 21/40; H04N 21/20–80
See application file for complete search history.

(56) References Cited

U.S. PATENT DOCUMENTS

| | | | |
|---|---|---|---|
| 6,816,880 B1 * | 11/2004 | Strandberg | G06F 9/451 709/204 |
| 8,332,590 B1 * | 12/2012 | Rohana | G06F 12/0855 711/140 |
| 9,578,272 B2 * | 2/2017 | Kim | G06F 9/4401 |
| 2002/0019831 A1 * | 2/2002 | Wade | H04L 9/40 715/202 |
| 2002/0097322 A1 * | 7/2002 | Monroe | G08B 13/19667 348/E7.086 |
| 2002/0184623 A1 * | 12/2002 | Hodge | H04N 21/47 725/39 |
| 2004/0236795 A1 * | 11/2004 | Johnston | H04L 67/06 |
| 2005/0108125 A1 * | 5/2005 | Goodwin | G06Q 40/00 705/37 |
| 2008/0288763 A1 * | 11/2008 | Reik | G06F 9/4401 713/2 |

(Continued)

*Primary Examiner* — Mushfikh I Alam
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for display dynamic splash screens using a media device during a launch sequence of an application without interrupting or delaying processing of the launch sequence. A launch sequence may be considered to include operations for compiling code associated with the application and operations for displaying splash screens. An example embodiment operates by the media device launching the application responsive to receiving a request and while code for the application is being compiled, selecting and displaying a dynamic splash screen. Operations of compiling code and displaying the splash screen may be performed under the control of the media device operating system and control is passed from the operating system to the application after launch sequence is completed.

20 Claims, 7 Drawing Sheets

(56) References Cited

U.S. PATENT DOCUMENTS

| | | | | |
|---|---|---|---|---|
| 2010/0161720 | A1* | 6/2010 | Colligan | H04M 3/4878 |
| | | | | 711/E12.002 |
| 2012/0086857 | A1* | 4/2012 | Kim | H04N 21/4438 |
| | | | | 348/563 |
| 2012/0180085 | A1* | 7/2012 | Tausworthe | H04N 21/812 |
| | | | | 348/731 |
| 2012/0289147 | A1* | 11/2012 | Raleigh | H04N 21/25808 |
| | | | | 455/3.06 |
| 2013/0123973 | A1* | 5/2013 | Saranow | A45D 19/00 |
| | | | | 700/233 |
| 2014/0253574 | A1* | 9/2014 | Brown | G06T 1/0007 |
| | | | | 345/545 |
| 2014/0327677 | A1* | 11/2014 | Walker | H04N 21/845 |
| | | | | 345/440 |
| 2014/0380289 | A1* | 12/2014 | Kalogeropulos | G06F 8/443 |
| | | | | 717/152 |
| 2016/0173693 | A1* | 6/2016 | Spievak | G06Q 30/0269 |
| | | | | 379/265.09 |
| 2017/0070792 | A1* | 3/2017 | Shaw | H04N 21/41407 |
| 2017/0177318 | A1* | 6/2017 | Mark | G06F 16/9535 |
| 2017/0251255 | A1* | 8/2017 | Deshpande | H04N 21/85 |
| 2018/0095677 | A1* | 4/2018 | Chrobak | G09G 5/393 |
| 2018/0307497 | A1* | 10/2018 | Chandrasekaran | G06F 9/4401 |
| 2019/0138317 | A1* | 5/2019 | Figueroa | G06F 3/04842 |
| 2022/0182427 | A1* | 6/2022 | Kolbert-Hyle | H04L 67/02 |
| 2022/0291934 | A1* | 9/2022 | Mo | G06F 9/451 |

* cited by examiner

DYNAMIC SPLASH SCREEN DURING AN APPLICATION LAUNCH SEQUENCE FOR MEDIA STREAMING DEVICES

BACKGROUND

Field

This disclosure is generally directed to improving application launching for operating systems on media streaming devices, and more particularly, toward optimizing the use of animated splash screens while an application is being loaded by a processor on a media streaming device.

Background

When launching applications, media streaming devices typically will display a loading or splash screen associated with a launched application to indicate to the user that the application is being loaded. The loading sequence on media streaming devices generally include the steps of launching the application, displaying a static splash screen while the media operating system of the media streaming device is preparing the application, and handing off control of the processor in the media streaming device from the media operating system to the launched application. Once the launched application has control of the processor, the launched application may typically then display an animation as part of transitioning from the static splash screen to the application's launch screen.

Every millisecond counts for an optimal user experience when launching an application on a media streaming device. There are two important and competing factors to consider: minimizing the amount of time of the launch sequence (i.e., the time between launching the application to displaying the launched application on a display) and maintaining engagement with the user during the launch sequence (e.g., letting the user know that the application is being loaded).

To minimize the time of the launch sequence, conventional media operating systems display a static splash screen during the launch sequence instead of a dynamic splash screen. Static splash screens, however, fail to engage the user during the launch sequence and, because they are static, may cause the user to question whether the media device is frozen, or worse still, the launched application has crashed if the launch sequence takes too long.

But simply using a conventional dynamic (or animated) splash screen causes another problem because it would require diverting resources of the operating system from processing the application launch sequence to processing and rendering the dynamic splash screen. In other words, displaying a dynamic splash screen will cause the media operating system to process two tasks in parallel—processing the dynamic splash screens and processing the application launch sequence—which will cause a perceptible delay in the launch sequence that is undesirable to the user experience.

Thus, what is needed is an improved and sophisticated mechanism for displaying dynamic splash screens during an application launch sequence without delaying the processing of the launch sequence.

SUMMARY

Provided herein are system, apparatus, article of manufacture, method and/or computer program product embodiments, and/or combinations and sub-combinations thereof, for displaying dynamic splash screens associated with an application using a media device without interrupting or delaying the launch of that application on the media device. The operations of displaying splash screens (static or dynamic) while compiling or otherwise initiating the compilation of code for the application to be launched may be considered part of a launch sequence for that application. The launch sequence may be initiated at the media device and may occur prior to the application being loaded and having control over the media device.

An example embodiment operates by downloading an application package to the media device and launching the application from the application package responsive to a request. As part of the launch sequence for that application, the media operating system of the media streaming device may begin compiling, or otherwise initiating the compilation of the application code of the launched application. Other actions that may take place during a launch include parsing the metadata of the application, decompressing streaming data associated with the application, mounting, and setting up security environment or 'sandbox' in preparation to load the application. And while the media operating system is controlling a processor of the media streaming device for compiling the application code, additional steps may be performed associated with the display of the splash screen. These steps may include detecting available splash screen options including a static splash screen and a dynamic splash screen. The processor (under control of the media operating system) may select the dynamic splash screen from the plurality of splash screen options and cause the selected splash screen to be displayed on a display device associated with the media streaming device.

The launch sequence may continue until the application is ready for display (e.g., after application code has been compiled or otherwise initiated). The dynamic splash screen may be displayed on the display device until the launch sequence is completed. At that point, after determining that the launch sequence is complete, the media operating system may pass control of the processor of the media device to the application. After the application has control, it may cause replacing the dynamic splash screen on the display device with the application user interface.

While described in the context of media streaming devices, this disclosure is not so limited. Instead, this disclosure is applicable to any system, apparatus, device, method, computer program product where it is desirable to display a splash screen while an application is launched.

BRIEF DESCRIPTION OF THE FIGURES

The accompanying drawings are incorporated herein and form a part of the specification.

In the drawings, reference numbers indicate identical or similar elements. Additionally the left-most digit(s) of a reference number identifies the drawing in which the reference number first appears.

DETAILED DESCRIPTION

Figure 1:
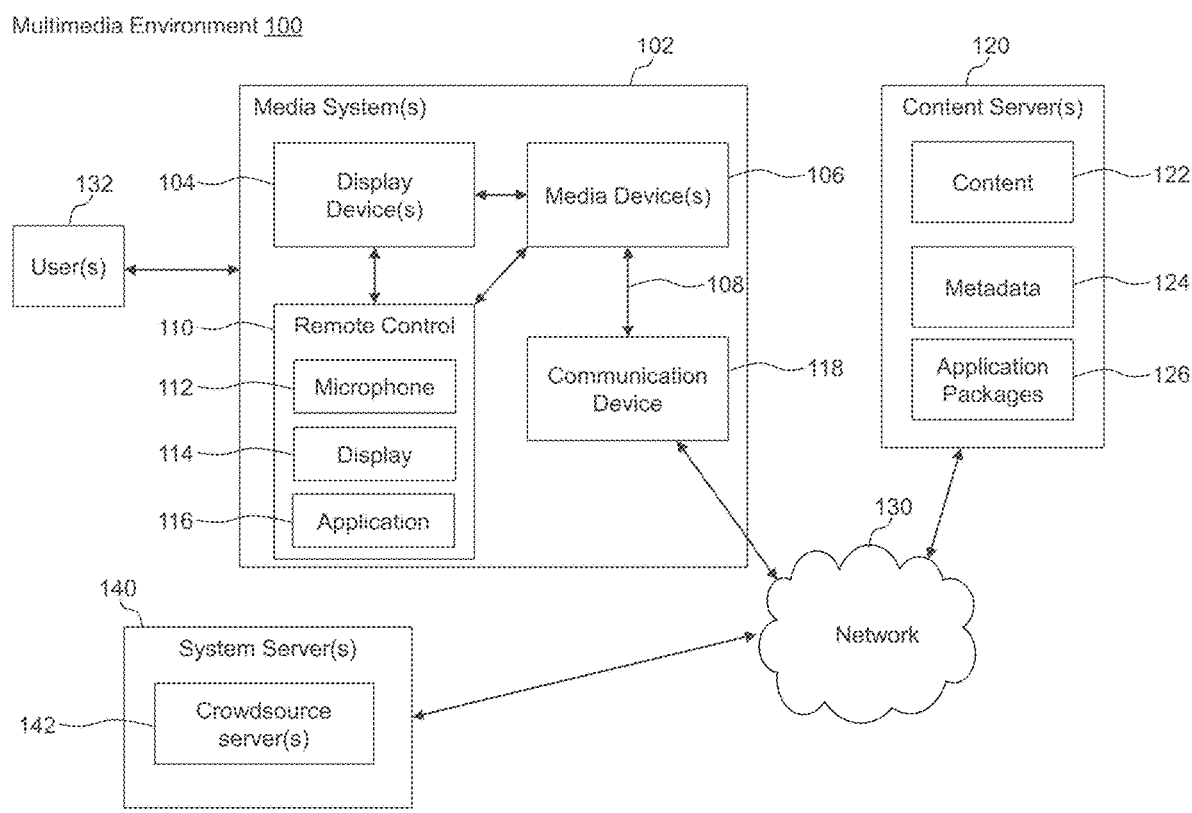
FIG. 1 illustrates a block diagram of a multimedia environment, according to some embodiments.

Provided herein are system, apparatus, device, method and/or computer program product embodiments, and/or combinations and sub-combinations thereof, for displaying dynamic splash screens, such as splash screens that include animation or that have interactive elements that request user input, during a launch sequence of an application on a media device but without interrupting or delaying the time taken to perform the launch sequence. Particular embodiments are applicable to low-power devices such as set-top boxes and media streaming devices which utilize lower power processors when compared to high-power devices such as smartphones and tablets which utilize more recent or cutting-edge processors. As utilized in this disclosure, the launch sequence refers to operations that are performed as the media device transitions from one screen that allows selection of the application (e.g., a screen where the user has selected an application icon) to another screen where the selected application is displayed and ready for receiving user input.

As one example, the launch sequence may include operations performed by a processor of a media streaming device to compile the start-up code of the application as well as operations performed to display a splash screen on a display while the launch sequence is proceeding. In some embodiments, the launch sequence may be divided into two processes—displaying the splash screen and compilation and/or other initialization of code to launch the application—and a processor at the media streaming device may delegate these processes as needed to various components of the media streaming system. For example, the processes may be delegated such that they are executed in parallel, and the time needed to execute the compilation process is minimized.

It should be noted that, as technology continually advances, what may be considered a high-power device at one point in time may eventually be considered to be a low-power device in the future (e.g., 2-3 years). That is because what may be considered a fast processor and/or sufficient graphics memory eventually is replaced with an even faster processor and/or even more graphics memory. In that sense, the concept of a low-power device and a high-power device is relative. Accordingly, in some embodiments, a low-power device may be considered to be a device that conventionally utilizes a lower power processor relative to other contemporaneous devices. For example, to conserve costs, a set-top box or a media streaming device may utilize a slower processor (e.g., lower power processor or older model processor) compared to a smartphone that may utilize a faster processor (e.g., newest processor). In some embodiments, a low-power media streaming device may refer to a device that is optimized to perform tasks associated with a media streaming such as, streaming media content, processing media content, and displaying the media content such as via a graphical user interface.

Various embodiments of this disclosure may be particularly advantageous for such low-power devices where adding an additional processing step to an application launch sequence (i.e., decoding and displaying a dynamic splash screen) may cause interruptions or delays in the launch sequence and thereby negatively impacting the user experience. Embodiments of this disclosure provide improvements for allowing such devices to process, in parallel, these tasks thereby allowing for the display of a dynamic splash screen during a launch sequence without prolonging the time taken to compile the application for launch.

Various embodiments of this disclosure may be implemented using and/or may be part of a multimedia environment 100 shown in FIG. 1, in some embodiments. It is noted, however, that multimedia environment 100 is provided solely for illustrative purposes and is not limiting. Embodiments of this disclosure may be implemented using and/or may be part of environments different from and/or in addition to the multimedia environment 100, as will be appreciated by persons skilled in the relevant art(s) based on the teachings contained herein. An example of the multimedia environment 100 shall now be described.

Multimedia Environment

FIG. 1 illustrates a block diagram of a multimedia environment 100, according to some embodiments. In a non-limiting example, multimedia environment 100 may be directed to streaming media across a network, such as from a server (e.g., content server 120) to a media system (e.g., media system 102). However, this disclosure is applicable to any type of media (instead of or in addition to streaming media), as well as any mechanism, means, protocol, method and/or process for distributing media.

The multimedia environment 100 may include one or more media systems 102. A media system 102 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 102 to select and consume content. For example, user(s) 132 may interact with remote control 110 via a graphical user interface on the remote control 110, physical inputs on the remote control 110, or microphone 112, to select content for streaming.

Each media system 102 may include one or more media devices 106 each coupled to one or more display devices 104. It is noted that terms such as "coupled," "connected to," "attached," "linked," "combined" and similar terms may refer to physical, electrical, magnetic, logical, etc., connections, unless otherwise specified herein.

Media device 106 may be a device that relays media content such as a streaming media device, a set-top box, DVD or BLU-RAY device, audio/video playback device, cable box, and/or digital video recording device, to name just a few examples. In some embodiments, media device 106 may be implemented as a low-power device with a low power processor or a dedicated media processor. A low-power processor may refer to a slower processor (compared to contemporaneous processors) or an older processor that has been available for a number of years. A dedicated media processor may be implemented as a processor that is optimized for streaming media content from one source and providing it for display via a graphical user interface on display device 104. In some embodiments, a processor that is optimized for streaming media content may be a processor that is configured to perform a limited number of tasks associated only with streaming and presenting media content. As an example, a media processor may not be capable of processing tasks associated with a phone call. Accordingly, in some embodiments, media device 106 may be implemented as media streaming device with a dedicated media processor that is limited to performing tasks associated with streaming media content. In some embodiments, a low-power device may also refer to a device with limited storage capacity and/or limited graphics memory available for performing processing operations.

Display device 104 may be a monitor, television (TV), computer, smart phone, tablet, wearable device (such as a watch or glasses), appliance, internet of things (IoT) device, and/or projector, to name just a few examples. In some embodiments, media device 106 can be a part of, integrated with, operatively coupled to, and/or connected to display device 104.

Each media device 106 may be configured to communicate with network 130 via a communication device 118. The communication device 118 may include, for example, a cable modem or satellite TV transceiver. The media device 106 may communicate with the communication device 118 over a link 108, wherein the link 108 may include wireless (such as WiFi) and/or wired connections.

In various embodiments, the network 130 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 102 may include a remote control 110. The remote control 110 can be any component, part, apparatus and/or method for controlling the media device 106 and/or display device 104, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 104 using cellular, Bluetooth, infrared, etc., or any combination thereof. The remote control 110 may include a microphone 112, which is further described below. The remote control 110 may further include a display 114 for displaying a graphical user interface that enables user selection of content to be provided by media device(s) 106. In an embodiment, the graphical user interface is provided by a remote control application 116 installed in remote control 110. Display 114 may be of various size depending on the remote control 110. Examples of different screen sizes are discussed below.

The remote control application 116 may be installed on remote control 110 and may be configured to display a user interface for accessing content via media device(s) 106. The user interface may provide any means for allowing user(s) 132 to view, select, and otherwise identify content to be streamed by media device(s) 106. The user interface may include a predefined dimension (e.g., to fit the size of display 114) and predefined configuration that implements particular user interface elements at specific positions in the user interface. For example, the predefined configuration may implement a particular layout for a direction pad, volume controls, and other user interface elements for interacting with media content. The application may further include means for implementing an interface customization parameter that modifies the predefined dimension and/or the predefined configuration by, for example, either reducing the dimension to a smaller size or modifying the layout so that different user interface elements are displayed at different positions of the user interface.

In an embodiment, the remote control application 116 may also include means for monitoring local user interface usage information by user(s) 132. For example, the remote control application 116 may track how often certain user interface elements are utilized and may store this history in memory. These user interface elements include a direction pad and buttons for controlling the media content. In an embodiment, the usage information may be implemented as a ranked list identifying how often certain interface elements are used by user(s) 132. For example, the usage information may indicate that user(s) 132 utilizes the volume buttons—volume up, volume down, mute—more than other interface elements. The application may transmit the usage information to crowdsource server(s) 142.

Buttons may allow users to control playback of media content and provide access to other tools such as user settings, network settings. Another example a user interface element is a slider which may provide more granular control over playback (e.g., rewind or fast forward) or settings (e.g., adjusting volume, brightness, etc.)

The multimedia environment 100 may include a plurality of content servers 120 (also called content providers or sources 120). Although only one content server 120 is shown in FIG. 1, in practice the multimedia environment 100 may include any number of content servers 120. Each content server 120 may be configured to communicate with network 130.

Each content server 120 may store content 122, metadata 124, and application packages 126. Content 122 may include any combination of music, videos, movies, TV programs, multimedia, images, still pictures, text, graphics, gaming applications, advertisements, programming content, public service content, government content, local community content, software, applications, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

In some embodiments, one application package in the application packages 126 may comprise a bundle of an application (e.g., retrieved from content 122) and content associated with the application (e.g., retrieved from metadata 124). Examples of content associated with the application may include static splash screens, dynamic splash screens, links to static splash screens, and links to dynamic splash screens, and any programs such as a launch sequence program that may be executed for retrieving, displaying, and otherwise processing the content when it is provided from the content server 120. For example, upon receiving an input from user(s) 132, media device 106 may submit a request to install a selected application on media device 106. Upon receiving the request, the content server 120 may deliver an application package to the media device 106 corresponding to the selected application. An application package may include all data needed to be self-executing for installing the package on media device 106 and without requiring any further user input.

Upon installation, the content in the application package may be stored in appropriate locations on the media device 106 for later retrieval when the application is launched on media device 106. In some embodiments, instead of being locally stored on media device 106, the content may include links to the content server 120 which allow media device 106 to retrieve the content when needed from content server 120.

As a non-limiting example, the application package for an application may include a static splash screen and a link to a dynamic splash screen. It is understood that the contents of the application package are not limited to this particular configuration and may be implemented using any configuration of content consistent with the description in this disclosure. One reason the application may include a link to content (e.g., dynamic splash screen) is to conserve storage resources on the media device 106, such as when media device 106 is implemented as a low-power device with one or more of a limited or low-power processor, limited storage capacity, and limited graphics memory resources. After installing the application in the application package on media device 106, it may be selected by user(s) 132. Selection may result in a launch sequence for the program to be initiated. Instructions for the launch sequence may be included in the application package and are executed by a processor on media device 106, for example.

As one part of the launch sequence, media device 106 may compile an/or initialize code for the application. As one example, the code may be start-up code that initializes the application to prepare it for display by the media device 106. While the code is being compiled, the launch sequence may include displaying a splash screen. As part of this non-limiting example, media device 106 may determine whether to display the static splash screen or the dynamic splash screen. If the static splash screen, media device 106 may retrieve the static splash screen from local storage since it was included as part of the application package and stored locally when the application was installed on media device 106. If the dynamic splash screen is to be displayed, the media device 106 may access the link to retrieve the dynamic splash screen from content server 120. In other embodiments, the dynamic splash screen may also be part of the application package and also stored locally.

In some embodiments, content server 120 may include different application packages for different types of media device 106. For example, if the media device 106 is a media device with sufficient storage space, content server 120 may provide an application package that includes all relevant content to the media device 106. If the media device 106 is a media device with limited storage space, content server 120 may provide another streamlined application package that is smaller in size and that may include one or more links to the content on the content server 120 that may be access as needed by media device 106.

In some embodiments, responsive to receiving a request from media device 106, content server 120 may transmit a complete application package that includes all content associated with an application (e.g., static splash screen, dynamic splash screen, interactive splash screen) and stored locally on media device 106. Media device 106 may be configured to offload content to free storage capacity on the media device 106 when needed. For example, media device 106 may determine that additional storage space is needed to download another application or to otherwise improve operations on media device 106. In response to that determination, media device 106 may determine particular content that is currently stored on media device 106 and that can be replaced by a link to the same content that is located on content server 120.

The multimedia environment 100 may include one or more system servers 140. The system servers 140 may operate to support the media devices 106 from the cloud. It is noted that the structural and functional aspects of the system servers 140 may wholly or partially exist in the same or different ones of the system servers 140.

The media devices 106 may exist in thousands or millions of media systems 102. Accordingly, the media devices 106 may lend themselves to crowdsourcing embodiments and, thus, the system servers 140 may include one or more crowdsource servers 142.

For example, using information received from the media devices 106 in the thousands and millions of media systems 102, the crowdsource server(s) 142 may identify similarities and overlaps between closed captioning requests issued by different users 132 watching a particular movie. Based on such information, the crowdsource server(s) 142 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 142 may operate to cause closed captioning to be automatically turned on and/or off during future streaming of the movie.

Crowdsource server(s) 142 may further include user interface usage information such as how user(s) 132 interact with the user interface provided through their respective remote control 110 including the usage information described above. Crowdsource server(s) 142 may generate crowdsource user interface information that may identify usage history of the user interface for all remote controls that are connected to crowdsource server(s) 142. The crowdsource user interface information may be implemented as a ranked list identifying user interface elements that are most used by a plurality of users across multiple multimedia environments.

Figure 2:
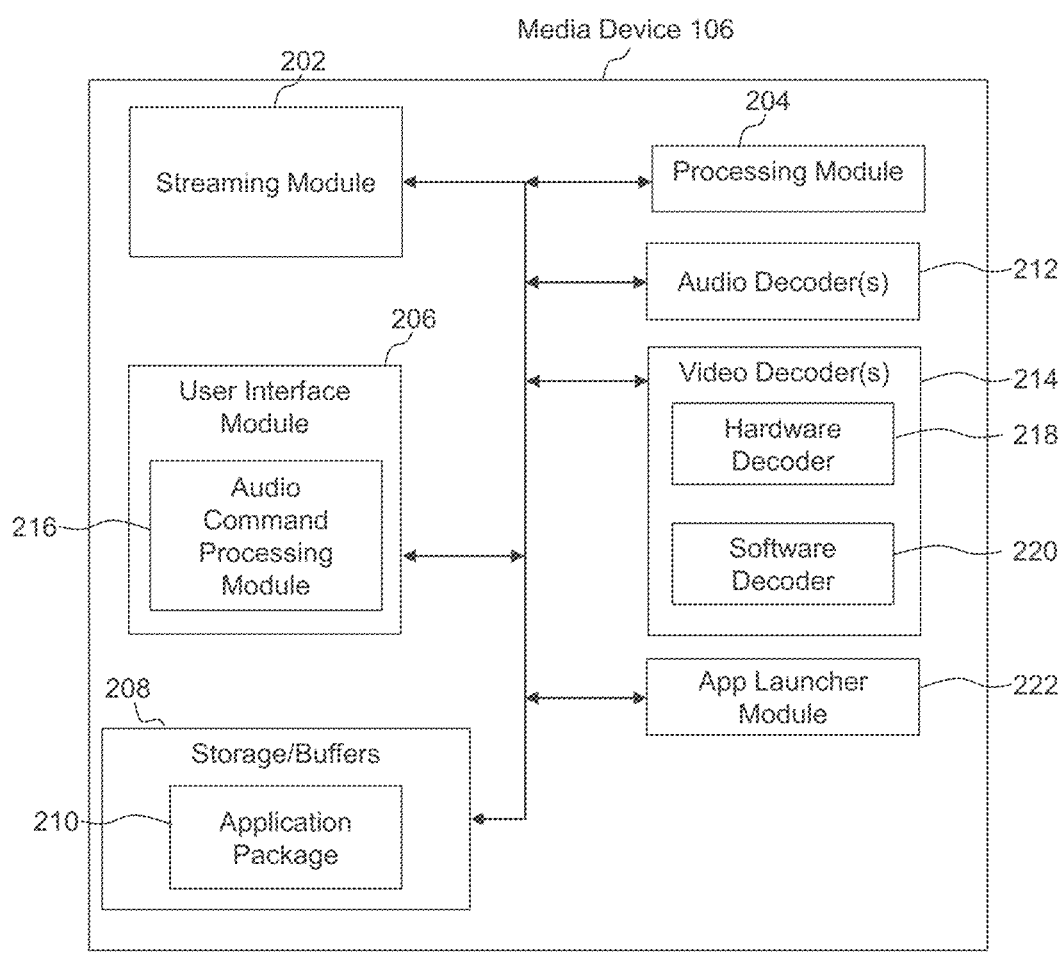
FIG. 2 illustrates a block diagram of a media device, according to some embodiments.

FIG. 2 illustrates a block diagram of an example media device 106, according to some embodiments. Media device 106 may include a streaming module 202, processing module 204, storage 208, and user interface module 206. As described above, the user interface module 206 may include the audio command processing module 216.

In streaming embodiments, the streaming module 202 may transmit the content to the display device 106 in real time or near real time as it receives such content from the content server(s) 120. In non-streaming embodiments, the media device 106 may store the content received from content server(s) 120 in storage 208 for later playback on display device 106.

Processing module 204 may be implemented using one or more cores. In some embodiments, each core may be configured to handle different processes or operations of the launch sequence. For example, processing module 204 may assign operations of the splash screen process to one core and operations for compiling the application.

The media device 106 may also include one or more audio decoders 212 and one or more video decoders 214. Each audio decoder may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

In some embodiments, video decoder 214 may be implemented as one or more of a hardware decoder 218 and a software decoder 220. Hardware decoder 218 may be implemented as a dedicated hardware component, such as a graphics processing unit. Software decoder 220 may be a combination of software that controls processing module 204 to perform video decoding. In some embodiments, processing module 204 may offload certain operations of the launch sequence to the video decoder 214 as needed. For example, processing module 204 may direct video decoder 214 to process and display the dynamic splash screen while processing module 204 compiles start-up code for launching the application. In some embodiments, processing module 204 and video decoder 214 may operate in parallel.

In some embodiments, media device 106 may include either hardware decoder 218 or software decoder 220. In other embodiments, media device 106 may include both. In such embodiments, processing module 204 may select a video decoder for decoding a selected splash screen. The selection of the video decoder may depend on a determination as to which video decoder will process the selected splash screen without interrupting or delaying the launch sequence (e.g., the compilation of the application code).

The media device 106 may also include application launcher module 222 which may be configured to manage launch sequences for applications (e.g., responsive to a user selecting the application). Application launcher module 222 may be configured to manage selection of the splash screen to be displayed during the launch sequence. In some embodiments, application launcher module 222 may initiate the launch sequence and pass control to processing module 204. In some embodiments, processing module 204 may offload certain operations of the launch sequence to the application launcher module 222 as needed. For example, processing module 204 may direct application launcher module 222 to manage the splash screen process of the launch sequence including selecting the appropriate splash screen, selecting the video decoder 214 that is available on media device 106, and providing the selected splash screen to the selected video decoder 214.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 130. The content server(s) 120 may transmit the requested content to the streaming module 202. The media device 106 may transmit the received content to the display device 106 for playback to the user 132. The media device 106 may store application packages received from content server 120 in storage 208. For example, media device 106 may store application package 210 in storage 208.

Figure 3:
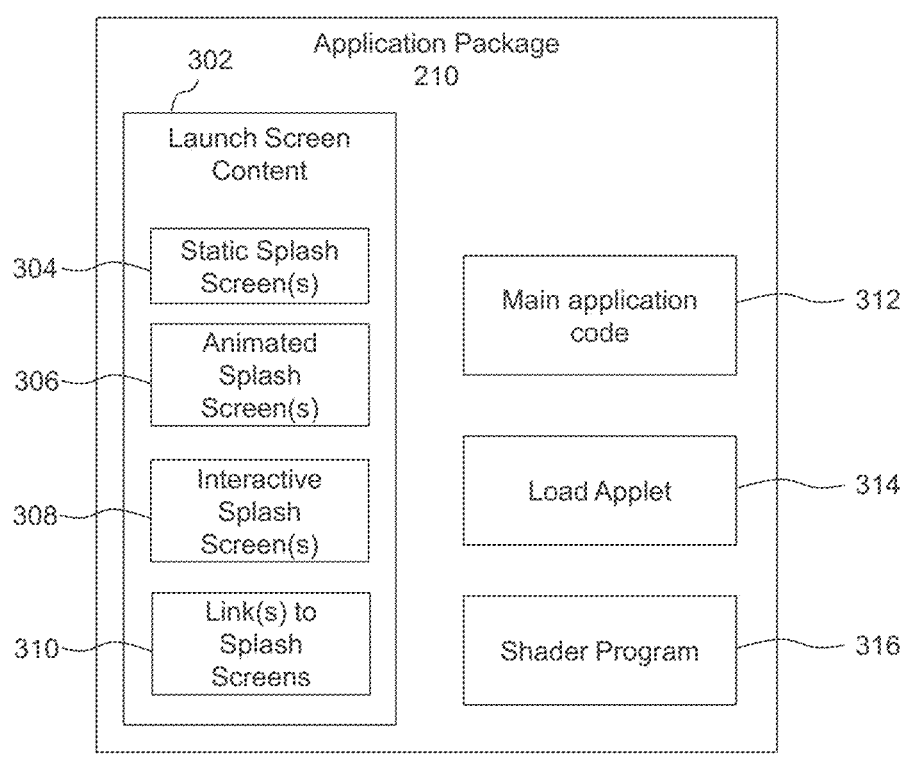
FIG. 3 illustrates a block diagram of an application bundle, according to some embodiments.

FIG. 3 illustrates a block diagram of an application package 210, according to some embodiments. Application package 210 may include launch screen content 302, main application code 312, a load applet 314, and a shader program 316. In some embodiments, launch screen content 302 may include any combination of one or more static splash screen(s) 304, one or more animated splash screen(s) 306, one or more interactive splash screen(s) 308, and one or more link(s) to load splash screens 310.

Splash screens are screens that are displayed while an application is being loaded by media device 106. Splash screens are a visual component of a launch sequence for that application. Static splash screen(s) 304 is a splash screen that may be implemented as a static image (i.e., without any animation). Non-limiting examples of a static splash screen(s) 304 include image files such as jpegs, portable network graphics (PNG), and bitmaps.

Animated splash screen(s) 306 is a splash screen that includes an animation. Non-limiting examples of an animated splash screen(s) 306 include any format of a video file discussed above (e.g., MPEG, MP4) or an animated image (i.e., a file that includes a sequence of images) such as a graphics interchange format (GIF) file, an animated PNG file (APNG), or a WebP file.

Interactive splash screen(s) 308 may be implemented as any screen that allows for user input during display of the screen. The format of an interactive splash screen(s) 308 may include a standard splash screen component such as an image, animated image, or a video and an interactive component. The interactive component may be implemented as an overlay over the splash screen component or may be integrated directly into the splash screen component. The interactive component may receive user input (e.g., received remote control 110) while the interactive splash screen(s) 308 is being displayed. The interactive component may be configured to change aspects of the standard splash screen component in response to receiving the user input. As one non-limiting example, an interactive splash screen(s) 308 may display visual indicators (e.g., a lighting effect) or play an audio indicator (e.g., an audio effect) in response to receiving user input which may provide an indication to the user that the media device 106 is not frozen and still processing the launch sequence. The visual and audio indicators may be displayed in addition to or may even replace the standard splash screen component. Animated splash screen(s) 306 and interactive splash screen(s) 308 are examples of dynamic splash screens.

Links to splash screen(s) 310 may also be included in launch screen content 302. Links may be provided to any of static splash screen(s) 304, animated splash screen(s) 306, or interactive splash screen(s) 308. Links may be in the form of a URL or other identifier that allows media device 106 to retrieve the associated splash screen from a server (e.g., content server 120). In some embodiments, launch screen content 302 may include links to splash screens either instead of or in addition to actual files of splash screens which allow the size of the application package 210 to be reduced. Media device 106 may access the links to retrieve and stream the associated splash screen from the content server 120 on an as-needed basis (e.g., upon the user selecting the application for launch).

Prior to download of application package 210, content server 120 may customize the launch screen content 302 based on the processing and storage capabilities of the media device 106 that is requesting the application package 210. For example, when media device 106 may submit a request to content server 120 for application package 210 upon a user selection to install the application on media device 106. The request may include information about the media device 106 such as device type, model number, processing capability, and storage capability. In some embodiments, only device type or model number is needed for the content server 120 to determine the capabilities of media device 106. Based on the determined capabilities of media device 106, content server 120 may select an application package 210 associated with the selected application; content server 120 may store multiple application packages associated with the selected application with each application being tailored to specific processing capabilities and/or storage capabilities.

For example, a lower-end media device may have slow processing capabilities, low graphics memory capabilities, and/or low storage capabilities that would make it challenging for the lower-end media device to process splash screens that require more intensive processing such as animated splash screen(s) 306 and interactive splash screen(s) 308. Content server 120 may provide a streamlined application package that is either smaller in size or requires less processing. For example, a streamlined application may include only static splash screen(s) 304 and/or may include link(s) to splash screens 310. As another example, a higher-end media device may have higher processing capabilities, higher graphics memory capabilities, and/or higher storage capabilities that would allow the higher-end media device to process any splash screen provided by content server 120. In this example, content server 120 may provide a complete application package that includes available splash screens associated with the application so that they may be stored and accessed locally at media device 106.

In some embodiments, content server 120 may dynamically generate application packages upon receiving the request from media device 106. In some embodiments, application packages may be already generated and stored on content server 120.

Main application code 312 is the software needed to run the application associated with the application package 210. Main application code 312 may also include instructions to processing module 204 for initiating and processing the launch sequence as well as other operations for executing the application on media device 106. The main application code 312 is the code that is being compiled during the launch sequence of the application.

In cloud embodiments, main application code 312 may be excluded from the application package 210 and may include a link to the main application code 312 that is stored remotely (e.g., on a cloud network, on content server 120). When media device 106 receives a request to start an application, media device 106 may initiate the launch sequence which results in the splash screen being displayed and the main application code 312 being streamed in the background from the remote source to media device 106. When main application code 312 is downloaded and compiled, media device 106 may transition from the display of the splash screen to a display of the application user interface which is ready for further user input.

The decision whether to include the main application code 312 in the application package 210 may be based on similar considerations of the capabilities of media device 106 as discussed above with regard to whether to provide a streamlined or more complete application package to media device 106.

Load applet 314 may be considered a lightweight program compared to main application code 312. In some embodiments, load applet 314 may be implemented using a scripting language such as JavaScript or BrightScript. Load applet 314 may be initiated upon a user selecting the application for launch and runs in parallel with the compilation of the main application code 312 (e.g., by processing module 204). Load applet 314 may be configured to manage operations associated with displaying the splash screen of the application during the launch sequence. Operations may include selecting the splash screen, retrieving the splash screen from local storage on media device 106, streaming the splash screen from content server 120 (e.g., via a link in application package 210), sending the splash screen to video decoder 214, and displaying the splash screen as it is being decoded. Load applet 314 may also be configured to manage aspects of the launch sequence such as performing the transition from the display of the splash screen to the display of the application user interface after launch sequence has been completed (e.g., after compilation of the main application 312 is completed).

Selection of which splash screen to display may be performed by either processing module 204, load applet 314, or a combination of both and may be based on different factors including the processing and graphical memory capabilities of media device 106, as discussed above, as well as an estimated or predicted length of time needed to compile the main application code 312. For example, a shorter period of time to compile and launch the application may cause a selection of a static splash screen because a dynamic splash screen may include an animation or interaction that requires a predetermined amount of time to display. Conversely, a longer period of time for compiling the main application code 312 that matches or exceeds the predetermined to compile and launch the application may cause a selection of a dynamic splash screen since there is sufficient time for the animation or interaction to be displayed.

The length of time for compiling main application code 312 may be estimated by media device 106 based on, for example, the size of the main application code 312 and the processing capability of processing module 204. Alternatively, the length of time may be provided by content server 120 (e.g., included as metadata in the application package 210). For example, content server 120 may include estimated times for compiling for each application package based on different device types and may provide the estimated time for the particular device type of media device 106.

Shader program 316 may also be included in application package 210. Shader program 316 may be implemented as code that is executed by video decoder 214 (e.g., hardware decoder 218) or some other graphics pipeline implemented in media device 106. Shader program 316 may reduce the graphics processing load to be performed by other components of media device 106 by off-loading the processing onto the graphical software functions provided by shader program 316. Examples of shader programs are vertex shaders which convert shape vertices into three-dimensional coordinates and pixel shaders which generate renderings of a shape's attributes such as color and size.

Figure 4:
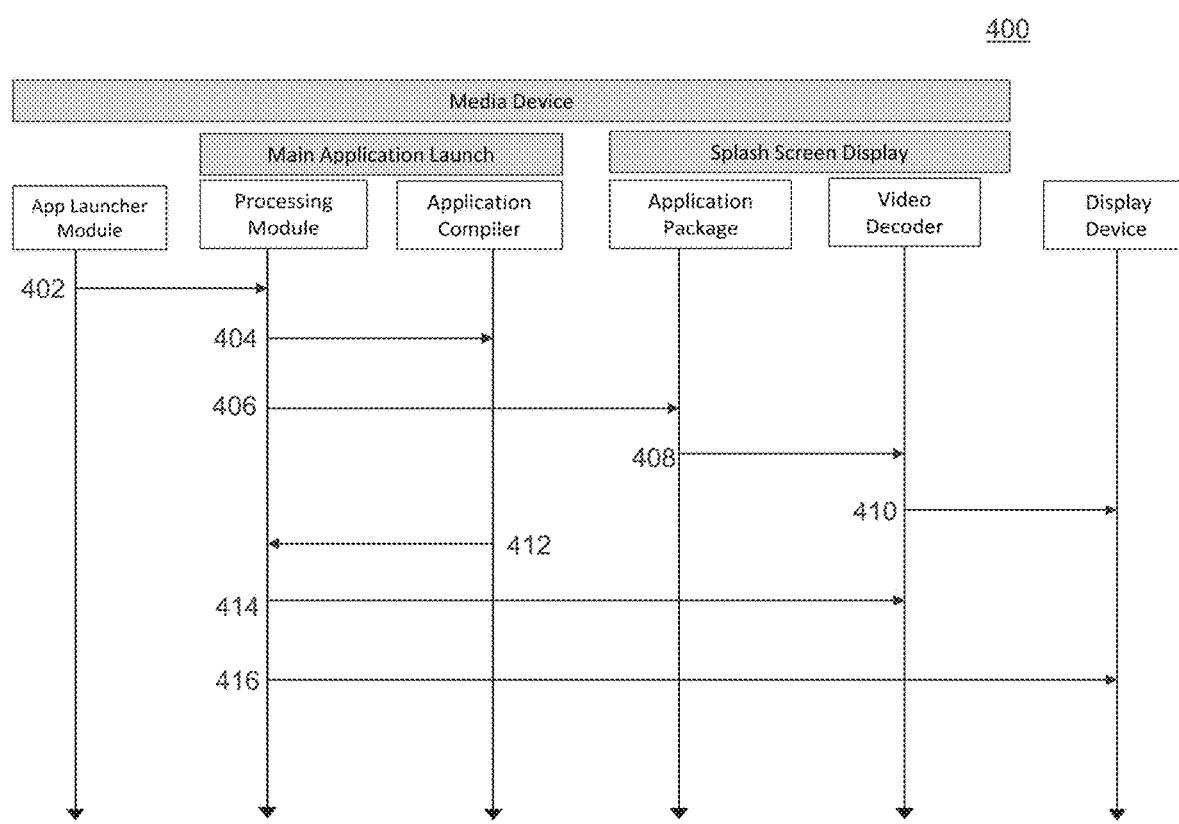
FIG. 4 illustrates an example signal diagram illustrating different communications between components of the multimedia environment, according to some embodiments.

Embodiments of Displaying Dynamic Splash Screens During an Application Launch Sequence FIG. 4 illustrates a signal diagram 400 illustrating different communications between components of the multimedia environment, according to some embodiments. As a non-limiting example with regards to FIGS. 1-3, one or more processes described with respect to FIG. 3 may be performed by a media device (e.g., media device 106 of FIG. 1) or a display device (e.g., display device 104 of FIG. 1). In such an embodiment, any of these components may execute code in memory to perform certain steps of diagram 400 of FIG. 4. While diagram 400 of FIG. 3 will be discussed below as being performed by media device 106, other devices may store the code and therefore may execute diagram 400 by directly executing the code. Accordingly, the following discussion of diagram 400 will refer to devices of FIG. 2 as an exemplary non-limiting embodiment of diagram 400. Moreover, it is to be appreciated that not all steps may be needed to perform the disclosure provided herein. Further, some of the steps may be performed simultaneously or in a different order than shown in FIG. 4, as will be understood by a person of ordinary skill in the art.

In 402, application launcher module 222 may be initiated upon the media device 106 receiving user input to launch an application on the media device 106. Application launcher module 222 may receive the request to launch the application and retrieve the necessary code and data from application package 210. Application launcher module 222 may then pass any instructions and/or this received information as needed to processing module 204.

In 404, processing module 204 may instruct an application compiler to compile or otherwise initiate compilation of the application code associated with the selected application as part of launching the main application. In some embodiments, application launcher module 222 may manage the compilation process of the application launch. In some embodiments, processing module 204 may include the application compiler which can be implemented as a process in processing module 204. In other embodiments, application compiler may be implemented as a separate module in media device 106.

In 406, processing module 204 may, in parallel or substantially in parallel, with 404, begin operations for displaying the splash screen on a display device including selecting a splash screen from the launch screen content 302. In some embodiments, processing module 204 may instruct a core in processing module 204 to manage the operations for displaying the splash screen. In other embodiments, processing module 204 may instruct load applet 314 to manage the operations. In yet other embodiments, the responsibilities for managing the operations may be shared between processing module 204 and load applet 314.

In 408, the component managing the splash screen launch (e.g., processing module 204, load applet 314) may direct the selected splash screen to be transmitted from application package 210 to video decoder 214 for decoding. In some embodiments, this direction may further include information regarding whether to use hardware or software decoding. This additional direction may be based on capabilities of media device 106 (e.g., whether video decoder 214 includes hardware decoder 218 and/or software decoder 220) and determined by the component that manages the splash screen launch.

In some embodiments, shader program 318 may be used instead of video decoder 214 for processing the selected splash screen. The decision whether to utilize video decoder 214 and shader program 318 may be determined by processing module 204 and/or load applet 314 and may be based on the processing capabilities and graphical memory capabilities of media device 106.

In 410, video decoder 214 provides the decoded splash screen for display on display device 104. In embodiments where shader program 318 performs the decoding, then shader program 318 provides the decoded splash screen for display on display device 104.

In 412, application compiler notifies processing module 204 that compilation of the application is nearing completion (e.g., a certain number of time remaining until compilation is completed) or when compilation is actually completed.

In 414, processing module 204, upon receiving the notification from the application compiler, begins the transition process from displaying the splash screen to displaying the application user interface. As part of this process, processing module 204 may notify video decoder 214 to transition from displaying the splash screen.

In 416, processing module 204, as a further step in the transition process, may then provide the application user interface for display on display device 104.

In some embodiments, steps 404-414 occur while the operating system of the media device 106 controls processing module 204 and the operating system is responsible for managing the steps. In 416, control of processing module 204 may be passed to the launched application which directs processing module 204 to transmit the application user interface to the display device. That is, the operating system of the media device 106 may control the media device 106 during operations for compiling the application code and the display of the splash screen; when compilation of the application code is complete, control of media device 106 may transition to the launched application which then directs media device 106 to perform operations associated with the application user interface. As noted above, other actions beside compilation of application code may be taking place during the launch. For example, the operating system may parse the metadata of the application that is provided in application package 210, decompressing streaming data associated with the application such as for buffering, and setting up a security environment or 'sandbox' within the media operating system in preparation to safely load the application.

Figure 5:
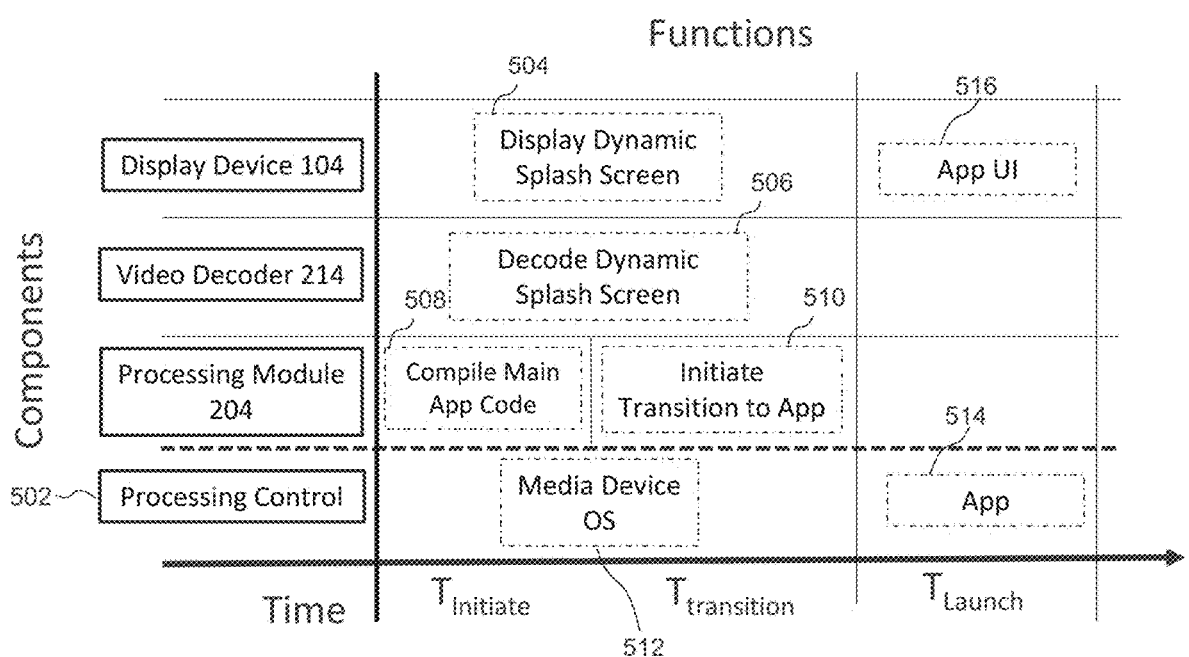
FIG. 5 is an example sequence diagram illustrating a time sequence function performed different components a media device, according to some embodiments.

FIG. 5 is a diagram of an application launch sequence 500 illustrating a time sequence functions performed different components a media device, according to some embodiments. As a non-limiting example with regards to FIGS. 1-3, one or more functions described with respect to FIG. 5 may be performed by a media device (e.g., media device 106 of FIG. 1) or a display device (e.g., display device 104 of FIG. 1). In such an embodiment, any of these components may execute code in memory to perform certain functions of application launch sequence 500 of FIG. 5. While application launch sequence 500 of FIG. 5 will be discussed below as being performed by certain components of media system 102, other components may store the code and therefore may execute application launch sequence 500 by directly executing the code. Accordingly, the following discussion of application launch sequence 500 will refer to devices of FIG. 2 as an exemplary non-limiting embodiment. Moreover, it is to be appreciated that not all steps may be needed to perform the disclosure provided herein. Further, some of the functions may be performed simultaneously, in a different order, or by the same components than shown in FIG. 5, as will be understood by a person of ordinary skill in the art.

Application launch sequence 500 depicts components of media system 102 and functions that they perform at certain time periods, $T_{initiate}$, $T_{transition}$, and $T_{launch}$, of a launch sequence of a selected application. Application launch sequence 500 may include functions performed by display device 104, processing module 204 of media device 106 and video decoder 214 of media device 106. Application launch sequence 500 also depicts processing control 502 which represents which software component of media device 106 has control over the processing control of the media device 106 at certain time periods of the launch sequence.

Time period $T_{initiate}$ refers to a time period where initialization operations of the launch sequence, including displaying of a splash screen and compilation of application code, are performed in parallel or substantially in parallel by components of the media system 102. Being performed in parallel does not necessarily mean that operations must begin or start at the same point in time of the launch sequence. In some embodiments, operations performed in parallel may refer to operations that, at some point in the time period, overlap in their execution by the respective components. In other words, operations may be ongoing in parallel but did not necessarily have to be initiated at the same time or end at the same time.

During time period $T_{initiate}$, operation 512 indicates that the main operating system of the media device 106 is currently delegated with processing control 502 of the media device 106. The component that has processing control 502 of the media device 106 means that the component has primary control of processing module 204 and may issue instructions to processing module 204 for execution. Example instructions may include compiling main application code 508. Compiling the main application code 508 may refer to the processing module 204 executing instructions provided in application package 210 such as main application code 312 to prepare the application for display on display device 104.

During time period $T_{initiate}$, video decoder 214 may be responsible for decoding a dynamic splash screen 506. In some embodiments, the dynamic splash screen being decoded by video decoder 214 is provided by processing module 204 concurrently as it is compiling main application code 508. In other embodiments, processing module 204 is implemented with one or more cores and may delegate one processing core to compiling main application code 508 and a second core for managing operations of video decoder 214. In other embodiments, processing module 204 may delegate responsibility for controlling video decoder 214 to load applet 314 (e.g., provided in application package 210); in such embodiments, load applet 314 may select and provide the dynamic splash screen to the video decoder 214 for decoding in 506. During time period $T_{initiate}$, video decoder 214 may communicate the decoded dynamic splash screen to display device 104 for display at 504.

Time period $T_{transition}$ refers to a time period where operations are performed to transition from the initialization operations (e.g., displaying the splash screen) to displaying the application user interface. During time period $T_{transition}$, the main operating system of the media device 106 maintains processing control 502 of the media device 106 and is responsible for managing the transition from the display of the splash screen to the display of the application user interface. Processing module 204 has completed compiling the main application code and may initiate a transition 510 to launching the application for display. As part of this transition, processing module 204 (or the component that is managing the decoding process) may transmit instructions to video decoder 214 to indicate that a transition is taking place from displaying the splash screen to displaying the application user interface. Video decoder 214 may then complete decoding operations of the dynamic splash screen. During $T_{transition}$, display device 104 may continue to display the dynamic splash screen at 504 until the application user interface is ready for display.

Time period $T_{launch}$ refers to a time period where operations are performed to display the application user interface when the application is ready to be displayed to the user. During time period $T_{launch}$, processing control 502 of media device 106 is transferred from the main operating system of the media device 106 to the application 514 that is being launched. This transfer occurs after processing module 204 has completed compiling the main application code of the application and the application is ready for launch and display on display device 104. When the application 514 has control over processing control 502 of the media device 106, application 514 may display its user interface 516 on the display device 104.

Figure 6:
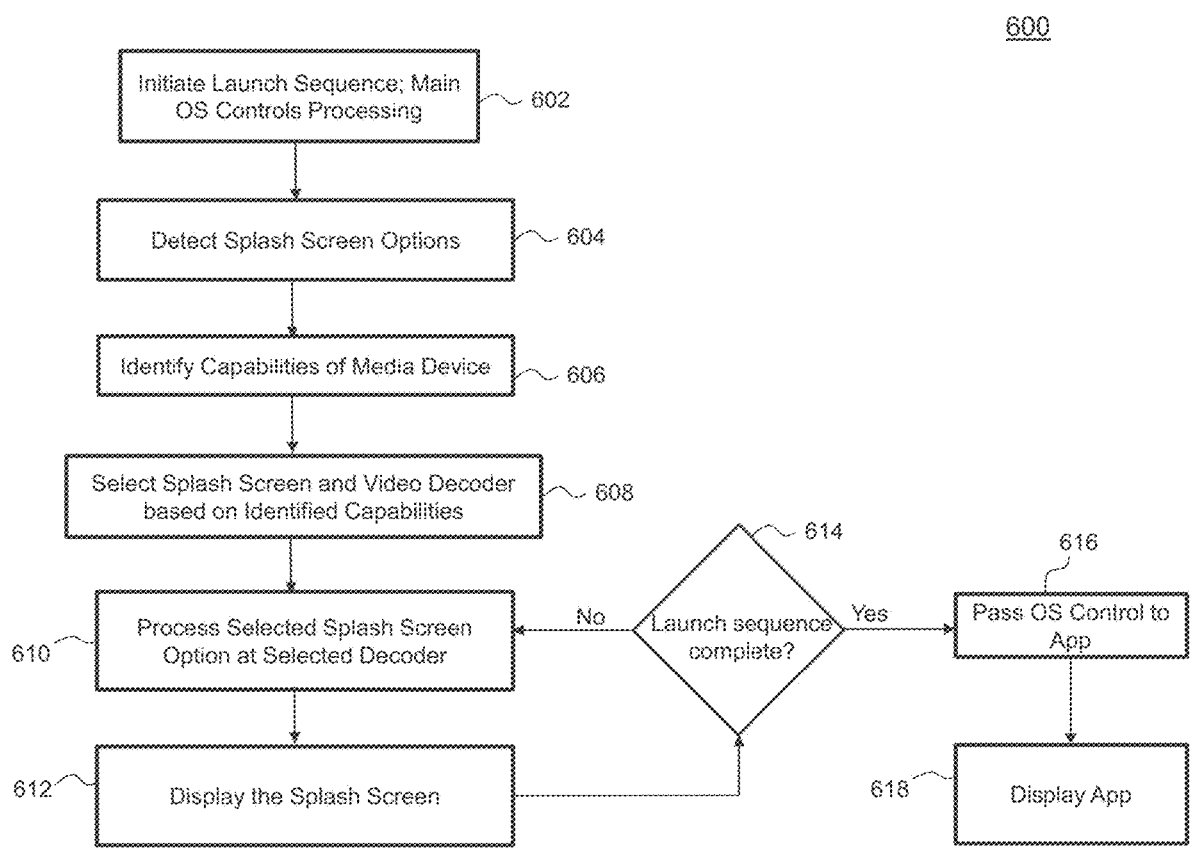
FIG. 6 is a flowchart illustrating a method for displaying a splash screen during an application launch sequence, according to some embodiments.

FIG. 6 is a method 600 illustrating a method for displaying a splash screen during an application launch sequence, according to some embodiments. As a non-limiting example with regards to FIGS. 1-3, one or more processes described with respect to FIG. 6 may be performed by a media device (e.g., media device 106 of FIG. 1) or a display device (e.g., display device 104 of FIG. 1). In such an embodiment, any of these components may execute code in memory to perform certain steps of method 600 of FIG. 6. While method 600 of FIG. 6 will be discussed below as being performed by media device 106, other devices may store the code and therefore may execute method 600 by directly executing the code. Accordingly, the following discussion of method 600 will refer to devices of FIG. 2 as an exemplary non-limiting embodiment of method 600. Moreover, it is to be appreciated that not all steps may be needed to perform the disclosure provided herein. Further, some of the steps may be performed simultaneously or in a different order than shown in FIG. 6, as will be understood by a person of ordinary skill in the art.

In 602, media device 106 may receive a request to launch a selected application and responsive to receiving the request, may initiate a launch sequence. This request may be received from a remote control 110 and responsive to media device 106 displaying a user interface with applications available to be selected and/or that have already been installed on the media device 106. For selection of an application that is already installed on media device 106, media device 106 may retrieve main application code 312 from application package 210 that is associated with the selected application. For selection of an application that is not yet installed on media device 106 (e.g., in a cloud network embodiment), media device 106 may stream main application code 312 from content server 120.

In 602, the operating system of media device 106 that controls the processing module 204 and is responsible for directing the processing module 204 initiates a launch sequence for the selected application. In some embodiments, the operating system may be a dedicated media operating system for streaming content via media device 106. When initiated, the launch sequence includes compiling application code of the application. The compilation may be performed by a processor under the control of the media operating system of the media streaming device.

Steps 604-612 may be performed in parallel or substantially in parallel with the main application code 312 being compiled. Steps 604-612 may be performed while the media operating system controls the processor of the media streaming device and while the application code is being compiled.

In 604, media device 106 may detect available splash screen options associated with the selected application. These splash screen options may include at least one of a static splash screen and a dynamic splash screen. In some embodiments, processing module 204 may perform the detection of the available splash screen options.

In 606, media device 106 may identify its capabilities for decoding and processing splash screens. In some embodiments, the capabilities may include a processing capability of processing module 204 and graphical memory capabilities of video decoder 214.

In 608, media device 106 may select a splash screen and decoder to be used for decoding the selected splash screen. In some embodiments, the identified capabilities of media device 106 may indicate that it is capable of or optimized for decoding dynamic splash screens without any negative impact on the compiling of the application code. Accordingly, media device 106 may select a dynamic splash screen from the plurality of splash screen options based on the identified capabilities of media device 106. In other embodiments, the identified capabilities of media device 106 may indicate that it is not capable of or optimized for decoding dynamic splash screens and may select a static splash screen from the plurality of splash screen options. In some embodiments, media device 106 may retrieve the selected splash screen locally if it was provided in application package 210 or may remotely if only the link to the selected splash screen was provided in application package 210.

In some embodiments, the selection of the video decoder may also be based on potential impact on the compiling operation. Media device 106 may select the best available video decoder that will minimize any impact (i.e., not delay or interrupt) the length of time it takes to compile the application.

In 610, the selected video decoder may decode the selected splash screen and provide the decoded splash screen for display on display device 104.

In 612, display device 104 displays the decoded splash screen as it is received from the selected video decoder.

In 614, media device 106 determines whether the launch sequence is completed. In some embodiments, this determination includes determining whether compiling and/or initialization of the application code is completed. For example, if processor module 204 is still compiling code, the launch sequence may be determined to not be completed and the method returns to 610 to continue decoding and displaying the splash screen.

In 616, if it is determined that the launch sequence is completed, such as by determining that the application code has been compiled, then the media operating system passes control of the media device 106 to the application. In some embodiments, passing control of the media device 106 means that the application may provide instructions to processing module 204 and otherwise control operations of media device 106. For example, when application has control over processing module 204, other applications installed on media device 106 may not provide instructions to media device 106. The application may return control back to the media operating system upon receiving a request to exit the application.

In 618, subsequent to passing the control of the processor of the media streaming device to the application, the application may direct media device 106 to provide the application user interface for display on the display device 104. Displaying the application user interface may include replacing the dynamic splash screen on the display device with the user interface.

In some embodiments, the media device 106 continues to instruct display device 104 to display the splash screen during and after the handover of control of the processor from the media operating system to the application. In such embodiments, the application may control the transition from displaying the splash screen to the application user interface. For example, the media operating system may grant the application control over user interface functions such as sound effects to be played to signal the transition, fading (i.e. fading from the splash screen to the application user interface), and other visual effects provided by media operating system. In this manner, the application may provide a more seamless transition from the splash screen to the user interface.

Example Computer System

Figure 7:
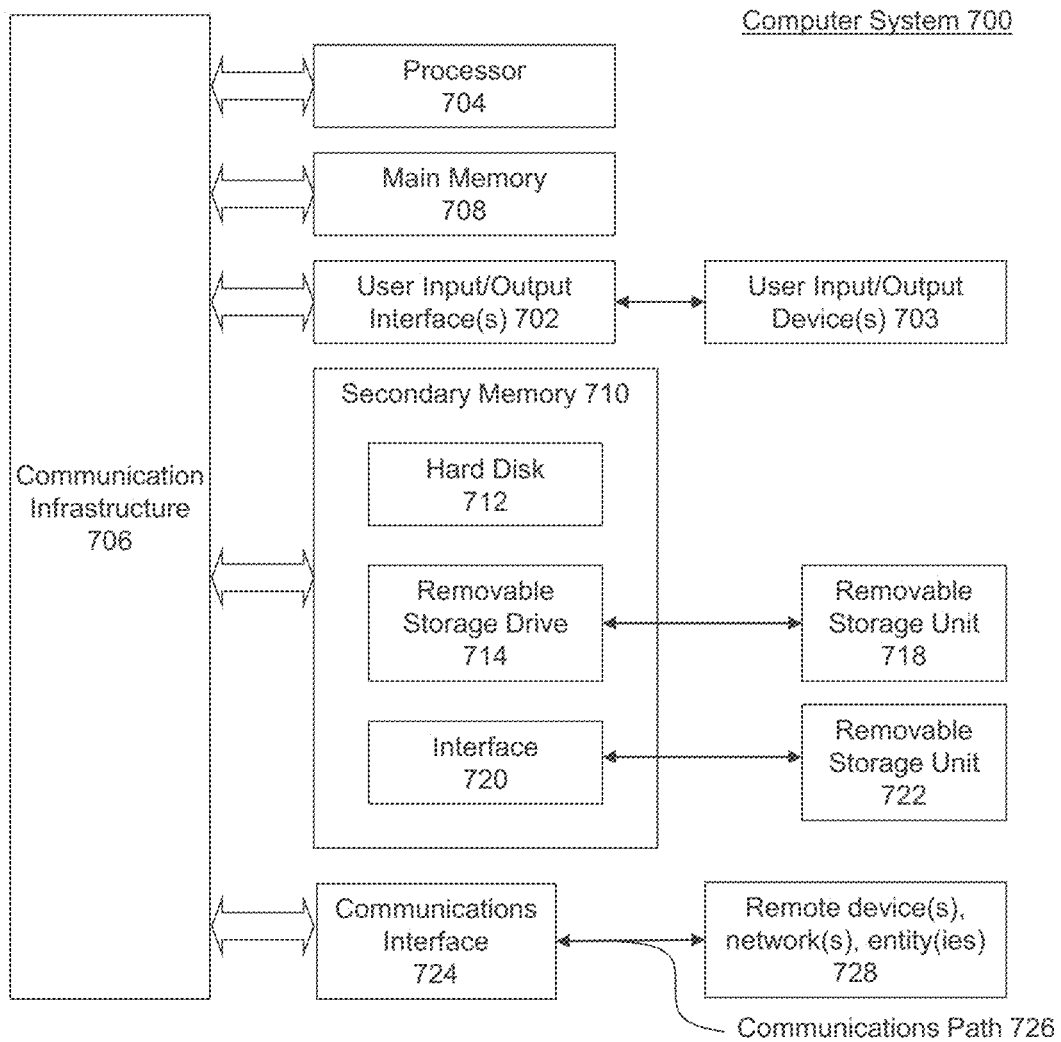
FIG. 7 illustrates an example computer system useful for implementing various embodiments.

Various embodiments may be implemented, for example, using one or more well-known computer systems, such as computer system 700 shown in FIG. 7. For example, the media device 106 may be implemented using combinations or sub-combinations of computer system 700. Also or alternatively, one or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method comprising:
    transmitting, by a media streaming device to a content server, a request for an application, wherein the request includes a device type of the media streaming device;
    receiving, by a media streaming device, an application package including the application, a static splash screen, a link to a dynamic splash screen, and a load applet, wherein the application package is customized based on the device type of the media streaming device;
    initiating a launch sequence responsive to a request to launch the application, wherein initiating the launch sequence comprises:
        delegating control of at least one processor of the media streaming device to a media operating system on the media streaming device, and while the media operating system controls the at least one processor, the launch sequence further comprises:
  at least one of compiling and initiating, by the at least one processor, an application code of the application;
  initiating the load applet to run in parallel with the at least one of compiling and initiating, by the at least one processor, the application code of the application;
  determining, by the load applet, whether to display the static splash screen or the dynamic splash screen, wherein the determining is based on an estimated loading time of the application by the media streaming device;
  causing, by the load applet and based on the determining, display of the dynamic splash screen on a display device associated with the media streaming device by accessing the link to the dynamic splash screen; and
  responsive to determining that the launch sequence is not complete, continuing to cause display of the dynamic splash screen on the display device;
responsive to determining that the launch sequence is complete:
  passing control of the at least one processor from the media operating system to the application; and
  causing display of the application on the display device subsequent to passing the control of the at least one processor to the application.

2. The method of claim 1, wherein the media streaming device is a low-power device.

3. The method of claim 2, wherein the low-power device is a dedicated set-top box device and the display device is a television.

4. The method of claim 1, wherein the application and the dynamic splash screen are stored on the media streaming device.

5. The method of claim 1, wherein the dynamic splash screen includes at least one of an animated splash screen and an interactive splash screen.

6. The method of claim 1, further comprising:
  detecting a video processing capability of the media streaming device, wherein selecting the dynamic splash screen is based on the video processing capability.

7. The method of claim 6, wherein the video processing capability indicates whether the at least one processor is a multi-core processor or the media streaming device includes a dedicated video decoder.

8. The method of claim 7, wherein displaying the dynamic splash screen further comprises:
  selecting a graphics decoder on the media streaming device; and
  displaying the dynamic splash screen on the display device using the graphics decoder of the media streaming device.

9. The method of claim 8, wherein the graphics decoder is one of a core of the multi-core processor or a dedicated graphics processor in the media streaming device.

10. The method of claim 1, wherein the display device is connected to the media streaming device via a wired connection.

11. The method of claim 1, further comprising:
  installing the application package on the media streaming device; and
  storing a plurality of splash screen options including the static splash screen and the link to the dynamic splash screen in a memory of the media streaming device.

12. The method of claim 1, wherein determining whether to display the static splash screen or the dynamic splash screen is based on an estimated length of time needed to compile the application code of the application.

13. A media streaming device, comprising:
a memory; and
at least one processor coupled to the memory and configured to perform operations comprising:
  transmitting, to a content server, a request for an application, wherein the request includes a device type of the media streaming device;
  receiving an application package including the application, a plurality of splash screen options including a static splash screen and a dynamic splash screen, and a load applet, wherein the application package is customized based on the device type of the media streaming device;
  initiating a launch sequence responsive to a request to launch the application, wherein the launch sequence comprises:
    delegating control of the at least one processor to a media operating system on the media streaming device, and while the media operating system controls the at least one processor, the launch sequence further comprises:
      at least one of compiling or initiating, by the at least one processor, an application code of the application, wherein the at least one processor is controlled by the media operating system;
      initiating the load applet to run in parallel with the at least one of compiling and initiating, by the at least one processor, the application code of the application;
      selecting, by the load applet, the dynamic splash screen from the plurality of splash screen options based on a determination whether to display the static splash screen or the dynamic splash screen, wherein the determination is based on an estimated loading time of the application by the media streaming device;
      causing, by the load applet, display of the dynamic splash screen on a display device associated with the media streaming device based on the selecting; and
      responsive to determining that the launch sequence is not complete, continuing to cause the display of the dynamic splash screen on the display device; and
  responsive to determining that the launch sequence is complete:
    passing the control of the at least one processor from the media operating system to the application; and
    causing display of the application on the display device subsequent to passing the control of the at least one processor to the application.

14. The media streaming device of claim 13, wherein the media streaming device is a low-power device.

15. The media streaming device of claim 14, wherein the low-power device is a dedicated set-top box device and the display device is a television.

16. The media streaming device of claim 13, wherein the determination whether to display the static splash screen or the dynamic splash screen is based on an estimated length of time needed to compile the application code of the application.

17. The media streaming device of claim 13, wherein the dynamic splash screen includes an at least one of an animated splash screen and an interactive splash screen.

18. The media streaming device of claim 13, the operations further comprising:
  detecting a video processing capability of the media streaming device, wherein selecting the dynamic splash screen is based on the video processing capability.

19. The media streaming device of claim 18, wherein the video processing capability indicates whether the at least one processor is a multi-core processor or the media streaming device includes a dedicated video decoder.

20. A non-transitory computer-readable medium having instructions stored thereon that, when executed by at least one computing device, cause the at least one computing device to perform operations comprising:
  transmitting, to a content server, a request for an application, wherein the request includes a device type of the media streaming device;
  receiving, by a media streaming device, an application package including the application, a dynamic splash screen, and a load applet, wherein the application package is customized based on the device type of the media streaming device;
  initiating a launch sequence responsive to a request to launch the application, wherein the launch sequence comprises:
    delegating control of at least one processor of the media streaming device to a media operating system on the media streaming device, and while the media operating system controls the at least one processor, the launch sequence further comprises:
      at least one of compiling or initiating, by the at least one processor, an application code of the application, wherein the at least one processor is controlled by the media operating system;
      initiating the load applet to run in parallel with the at least one of compiling and initiating, by the at least one processor, the application code of the application;
      detecting a plurality of splash screen options associated with the application, wherein the plurality of splash screen options includes a static splash screen and a dynamic splash screen;
      causing, by the load applet, display of the dynamic splash screen on a display device associated with the media streaming device, wherein selection of the dynamic splash screen is based on an estimated loading time of the application by the media streaming device; and
      responsive to determining that the launch sequence is not complete, continuing to cause the display of the dynamic splash screen on the display device; and
  responsive to determining that the launch sequence is complete:
    passing control of the at least one processor from the media operating system to the application; and
    causing display of the application on the display device subsequent to passing the control of the at least one processor to the application.

\* \* \* \* \*